(12) United States Patent
Nedbal et al.

(10) Patent No.: US 8,627,462 B2
(45) Date of Patent: Jan. 7, 2014

(54) TOKEN PROCESSING

(75) Inventors: Manuel Nedbal, Santa Clara, CA (US); Girish Viswambharan, Bangalore (IN); Vishwas Krishnamurthy, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 449 days.

(21) Appl. No.: 12/776,450

(22) Filed: May 10, 2010

(65) Prior Publication Data

US 2011/0277031 A1    Nov. 10, 2011

(51) Int. Cl.
*H04L 29/06*    (2006.01)

(52) U.S. Cl.
USPC ........ 726/22; 726/1; 726/11; 726/17; 726/23; 726/24; 726/25; 713/160; 713/164; 709/223; 709/225

(58) Field of Classification Search
USPC ........ 726/26, 1, 11, 17, 22–25; 709/223, 225; 713/160, 164
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,959,297 B2 * | 10/2005 | Oh et al. | 1/1 |
| 7,506,155 B1 | 3/2009 | Stewart et al. | |
| 7,735,116 B1 * | 6/2010 | Gauvin | 726/2 |
| 7,739,720 B2 * | 6/2010 | Samuelsson et al. | 726/1 |
| 2006/0005227 A1 * | 1/2006 | Samuelsson et al. | 726/1 |
| 2008/0244690 A1 * | 10/2008 | Kulkarni et al. | 726/1 |
| 2012/0023217 A1 * | 1/2012 | Wakumoto | 709/223 |

* cited by examiner

*Primary Examiner* — Brandon Hoffman
*Assistant Examiner* — Hee Song
(74) *Attorney, Agent, or Firm* — Patent Capital Group

(57) ABSTRACT

Methods, systems, and apparatus, including computer programs encoded on a computer storage medium, for mapping security processing rules into a data structure that facilitates a more efficient processing of the security processing rules. In one aspect, a method includes receiving security processing rules, each of the security processing rules defining one or more security checks and security operations corresponding to the security checks and that are to be performed when the security checks occur; and generating from the security processing rules a mapping of security checks to security operations, the mapping including a security check entry for each security check that is defined in one or more of the security processing rules, and each security check entry being mapped to one or more security operations that the security processing rules define as corresponding to the security check.

15 Claims, 7 Drawing Sheets

TOKEN PROCESSING

BACKGROUND

This specification relates to intrusion detection systems.

Modern computer networks are under a constant threat of unauthorized access by external attackers. Worms and other malicious software processes propagate through the Internet and infect computers. Hackers attempt to gain access to proprietary systems.

Intrusion detection software attempts to identify malicious attacks before they can compromise a computer network. New threats to network computers are continually discovered and intrusion detection systems need to check for attacks from these threats. At the same time, the increase in network transmission speeds requires a system to process more checks in less time.

One common form of intrusion detection is based on rules. Rules are designed to detect to a known threat. When a new threat is identified, a new rule may be constructed to detect it. For example, SNORT is an intrusion detections system with an extensible rule base. A rule in a rule set may describe multiple conditions which have to be met in order for the rule to be determined positive.

SUMMARY

This specification describes technologies relating to tokenizing and processing a security rule set.

In general, one innovative aspect of the subject matter described in this specification can be embodied in methods that include the actions of receiving security processing rules, each of the security processing rules defining one or more security checks and security operations corresponding to the security checks and that are to be performed when the security checks occur; and generating from the security processing rules a mapping of security checks to security operations, the mapping including a security check entry for each security check that is defined in one or more of the security processing rules, and each security check entry being mapped to one or more security operations that the security processing rules define as corresponding to the security check.

These and other embodiments can optionally include one or more of the following features. Generating from the security processing rules the mapping of security check to security processes may include generating a security check table having an entry for each security check, and wherein each entry: corresponds to a security check that is defined in one or more of the security processing rules and includes a virtual check table index and a virtual check value; generating a virtual check table having a number of entries for each virtual check table index that is equal to the virtual check value for the virtual check table index, and wherein each of the entries includes a security process table index and a security process value. Generating from the security processing rules the mapping of security check to security operations may also include generating a security processes table having a number of entries corresponding to each security process table index that is equal to the security process value for the security process table index, and wherein each of the entries includes a security operations table index and a security operations value corresponding to one or more security operations to be performed. Generating from the security processing rules the mapping of security check to security operations may include generating a security operations table having a number of entries corresponding to each security operation table index that is equal to the security operation value for the security operations table index, and wherein each of the entries includes an opcode and an operand identifying a security operation.

These and other embodiments can optionally include receiving token data, identifying a first security check to be processed from the security check table based on the token data, and identifying one or more security operations stored in the security operations table associated with the first security check; and applying at least one of the one or more security operations to the data. Applying the first security check to the data may includes terminating the first security check in response to determining that a security operation of the one or more security operations did not return a true value. Applying the first security check to the data may include determining not to process a second security check associated with the security operation. At least one security operation may be mapped to at least two security checks.

Other embodiments of this aspect include corresponding systems, apparatus, and computer programs configured to perform the actions of the methods encoded on computer storage devices.

Particular embodiments of the subject matter described in this specification can be implemented so as to realize one or more of the following advantages. Token analysis rules may be processed more rapidly. Redundant conditions which span multiple rules do not need to be checked multiple times. Memory used for storing rules may be used more efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
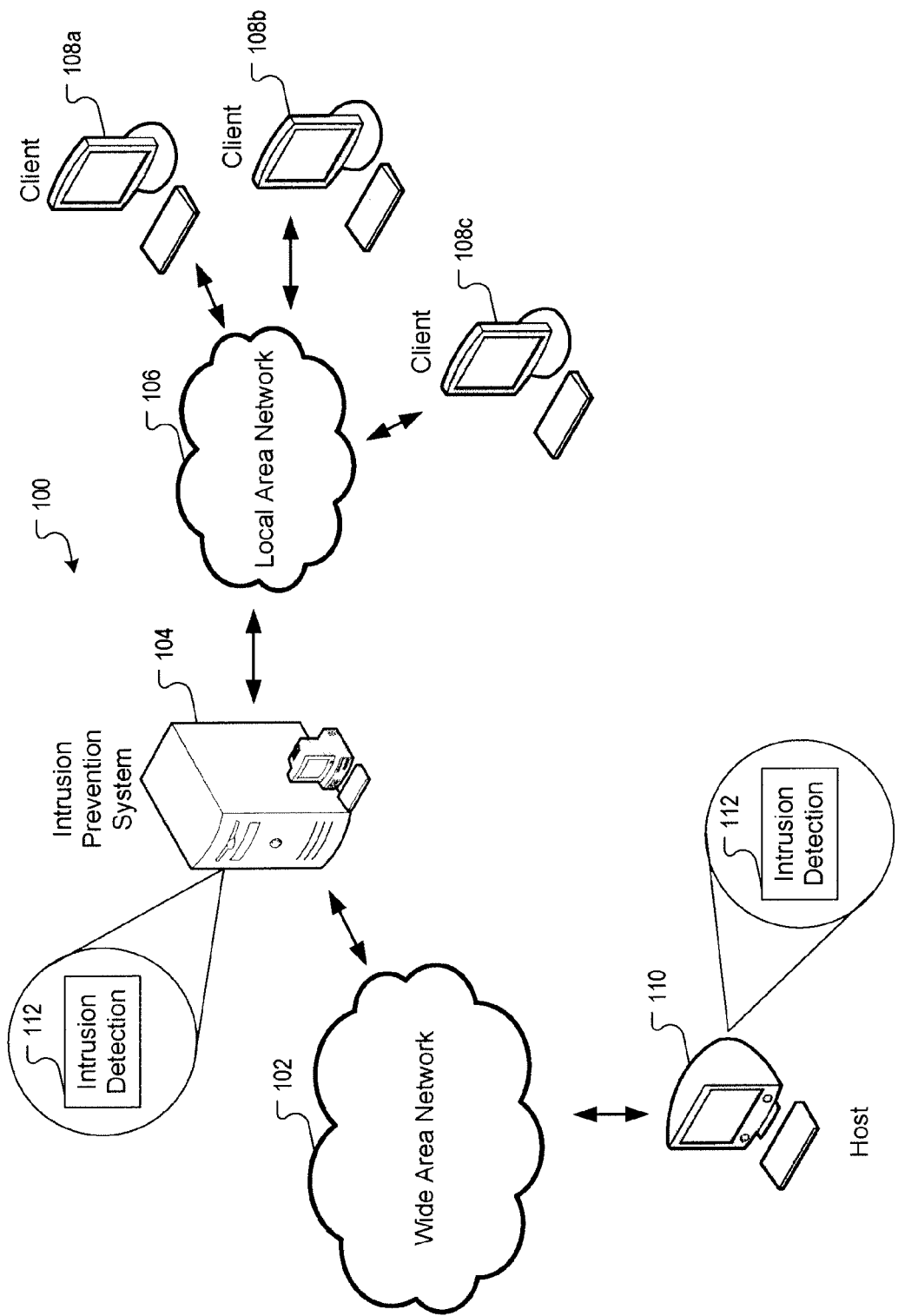
FIG. 1 is a block diagram showing an exemplary environment in which token processing occurs.

FIG. 1 is a block diagram showing an exemplary environment in which token processing occurs. Client computers 108a-c connect to a local area network 106. An intrusion prevention system 104 protects the local area network (LAN) 106 from traffic originating from a wide area network (WAN) 102. A example WAN is the Internet. A firewall server is often associated with a gateway, which acts as a transfer point connecting one network (the LAN 106) and another (the WAN 102), and a router, which directs network traffic to the appropriate network (the WAN 102 or LAN 106). Client computers 108a-c connect to the LAN 106. When a host computer 110 on the WAN 102 communicates with a client (for example client 108a) the message is routed through the intrusion prevention system 104. In some scenarios, a computer 110 may be directly connected to the WAN 102 may also act as a firewall.

The intrusion prevention system 104 and computer 110 may include an intrusion detection system 112. In some embodiments, an intrusion detection system 112 may also be included in a firewall or other networked device. The intrusion detection system 112 analyzes and logs network traffic, checking packets against a set of rules. Each rule specifies a set of conditions (i.e., one or more conditions) that must be satisfied for that rule to take effect. For example, the intrusion detection system has rules includes conditions to detect packets containing specified content, packets from a specific location, or packets directed to a specific destination. When a packet that satisfies all of the conditions of a particular rule is detected, the intrusion detection system 112 may take appropriate actions, such as blocking the packet or blocking traffic from the source of the packet, cleaning the packet, or even allowing the packet to pass. The remedial actions may be specified by the rule or specified by another rule set. When a packet fails to satisfy at least one security operation then the packet does not satisfy the rule.

Figure 2:
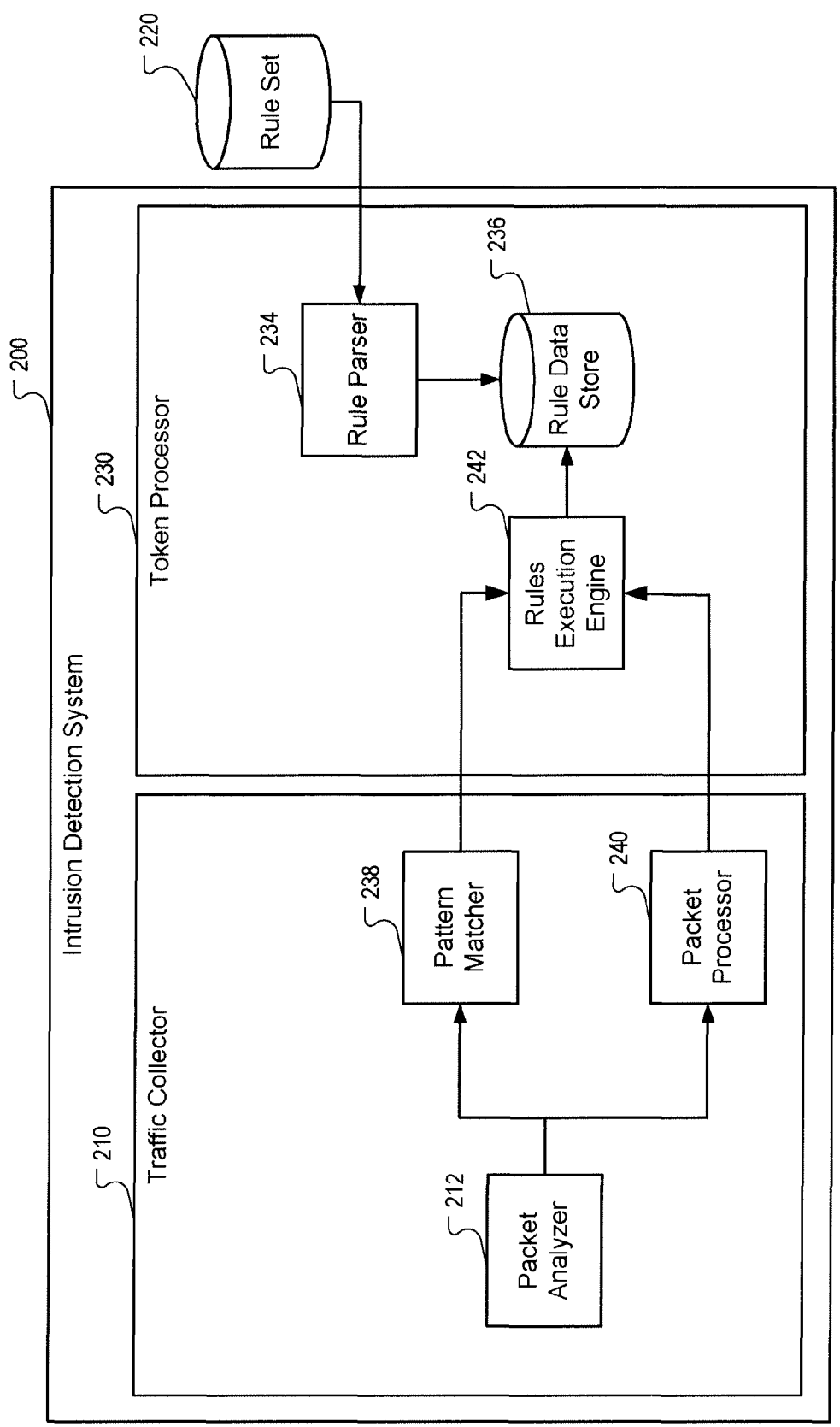
FIG. 2 is a block diagram of an exemplary intrusion detection system.

FIG. 2 is a block diagram of an exemplary intrusion detection system. The exemplary intrusion detection system 200 is an example of an intrusion detection system 112 of FIG. 1. The intrusion detection system contains two modules, a traffic collector 210 and a token processor 230. The traffic collector 210 collects data transmitted over the network for analysis by the token processor 230. The traffic collector 210 may include, among other components, a packet analyzer 212, a pattern matcher 338, and a packet processor 240. Generally, a packet analyzer 212 intercepts and logs traffic passing over a network. The packet analyzer 212 captures each packet and decodes the packet for analysis by the token processor 230.

The token processor 230 includes a rule parser 234, a rule data store 236, and a rules execution engine 242. The rule parser 234 receives a rule set 220. The rule set may be stored in a database or in a flat file. The rule parser 234 reads rules from the rule set and parses the rules into security checks, security processes, and security operations.

A security operation is an operation which may be performed against a packet. In general, security operations perform the operations to determine if the data satisfies the conditions of the rule. For example, a security operation may compare a packets source IP address, or its destination IP address, or the contents of its payload. Generally, a security operation may be defined by an opcode and an operand. A security process is a group of one or more security operations that are frequently performed together. For example, a security process may combine operations checking traffic with a destination of a particular server and a particular port (for example, traffic directed to a web server on port 80). A security check defines one or more security processes which define an alert condition. For example, traffic directed toward the web server on port 80 does not in itself raise constitute an attempted intrusion, instead the security check may combine other security processes which when taken together suggest an attempted intrusion. The rule parser 234 maps each of the security checks to one or more security processes and each of the security processes to one or more security checks. The parsed rules are tokenized into various token data structures. The token data structures are stored in a rule data store 236 for later processing by the rules execution engine 242. In some embodiments, the rule parser identifies content tokens and stores them in a data dictionary.

The token processor 230 receives packet information from the traffic collector 210. The pattern matcher 238 performs comparisons of packet information from the traffic collector 210 to the data dictionary. The data dictionary includes an indication as to which security checks to execute when the token is found in the packet information. Each token in the data dictionary identifies one or more security checks to be performed against the packet information.

The packet processor 240 receives packet information from the traffic collector 210. The packet processor identifies source and destination information associated with the packet, for example, the Internet Address of the packet source and the Internet Address of the intended destination of the packet. The source and destination information is compared to a list of source and destination information. If any of the source and destination information appears on the list, the list further identifies one or more security checks to be performed against the packet information.

The rules execution engine 242 receives the packet information and one or more checks to perform on the packet information. The rules execution engine 242 performs the security checks. To perform the security checks, the rules execution engine 242 performs all of the security processes associated with the security checks. If all of the security processes in the security check come back true, the rules execution engine 242 performs the alert action associated with the security check. Alternatively, if any of the security processes do not come back true, then processing for that security check ceases.

Figure 3:
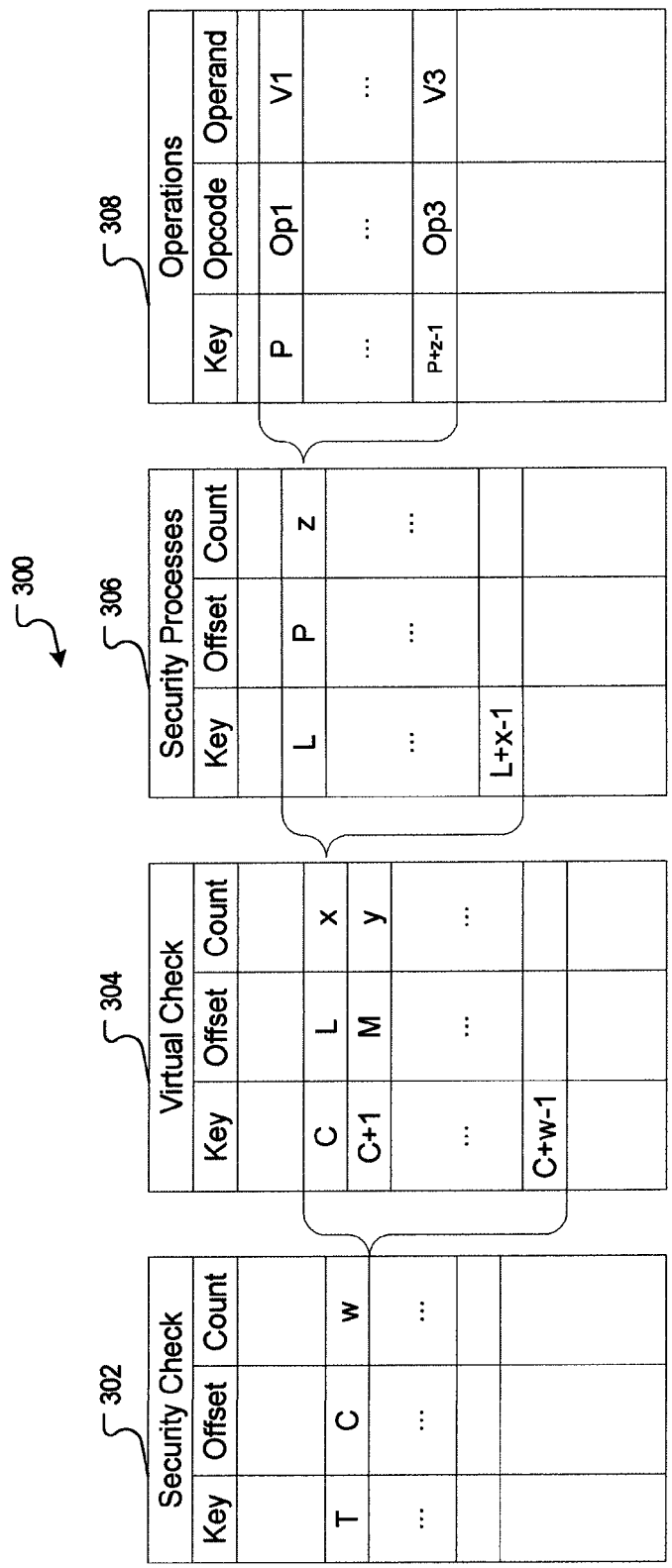
FIG. 3 is a diagram showing an exemplary data structure by which security checks are mapped to security processes.

FIG. 3 is a diagram showing an exemplary data structure 300 by which security checks representing the virtual tokens are mapped to virtual checks, which in turn are mapped to security processes, and security processes to security operations.

Security checks are stored in a security check data structure 302. Individual security checks are identified by a key. In this example, the key is an offset into the security check data structure that could be for example be identified by the ID of a found token. For example, a key of '5' may indicate the fifth security check stored in the security check data structure 302. In embodiments where the key is an offset into the security check data structure, the key does not have to be physically included in the data structure, but may be implicit. For example, the fifth security check stored in the security check data structure 302 remains the fifth security check regardless of whether the number '5' is stored in a key field. In other embodiments, the key may be a surrogate key that carries no particular meaning beyond identifying the entry in the data structure.

Each security check key identifies one or more virtual checks in a virtual check data structure 304. In this example, the security check identifies an offset into the virtual checks data structure and a count. The offset represents a key into the virtual check data structure 304. The count represents the number of entries to process, beginning at the offset.

Each virtual check key identifies one or more security processes in a security process data structure 306. In this example, the virtual check identifies an offset into the security processes data structure and a count. The offset represents a key into the security processes data structure 306. The count represents the number of entries to process, beginning at the offset. In general, virtual checks are designed to enable the reuse of the virtual check by different security checks.

Each security process key identifies one or more operations in an operations data structure 308. In this example, the security process identifies an offset into the operations data structure and a count. The offset represents a key into the operations data structure 308. The count represents the number of entries to process, beginning at the offset. In general, security processes are designed to enable the reuse of the security process by different virtual checks.

Figure 4:
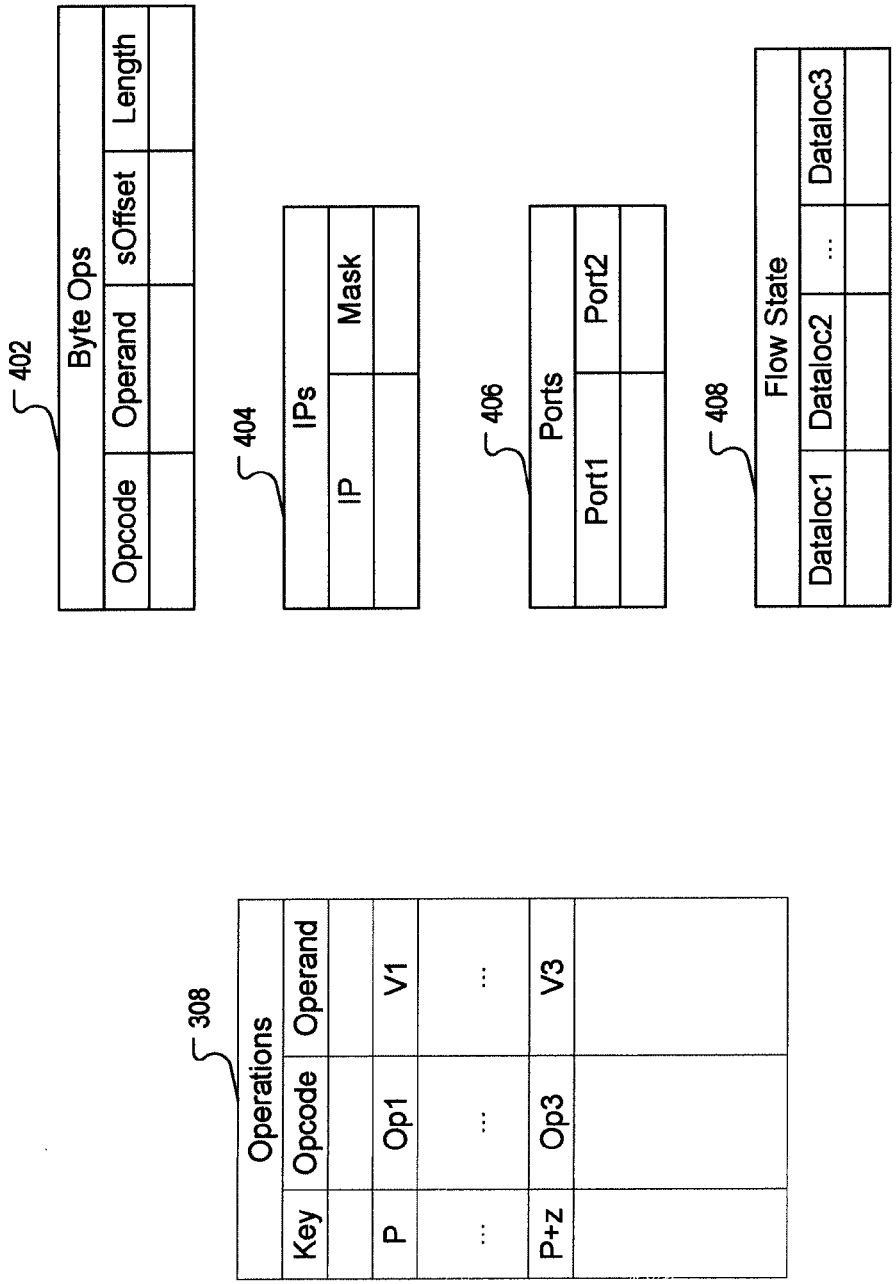
FIG. 4 shows exemplary data structure by which operations are described.

FIG. 4 shows an exemplary data structure by which operations are represented The operations data structure includes an opcode and an operand. The opcode and the operand inform the rules execution engine as to the operations to execute. Some opcodes and operands may provide sufficient information for the rule execution engine to perform the operations; other opcodes and operands identify operations which require further information. For example, an opcode and an operand combination may inform the rules execution engine to check the IP address of the destination of the packet against reference values. The reference values are stored in a separate data structure. Examples of reference value data structures include a byte operation data structure 402, an Internet Protocol address data structure 404, a port data structure 406, and a flow state data structure 408.

In general, the byte operation data structure 402 provides conditions relating to byte comparison operations. For example, the byte operations data structure may include an offset field and a length field.

The Internet Protocol address data structure 404 stores Internet Protocol (IP) addresses and a subnet mask information associated with operations. For example, the IP address data structure may specify a source and/or destination address from which a packet is received from or addressed to.

The ports data structure 406 stores ports information associated with operations. For example, the port data structure may specify a port of an IP address from which a packet is received from or addressed to.

The flow state data structure 408 stores flow state information associated with operations. Flow state data is used to detect a pattern of traffic on the network. For example, if a particular security check is triggered the resulting action may place an entry into the flow state table indicating that the security check was true. Later, another packet may result in another security check which is associated with a security operation which comes back true based on the existence of the entry in the flow state table.

Figure 5:
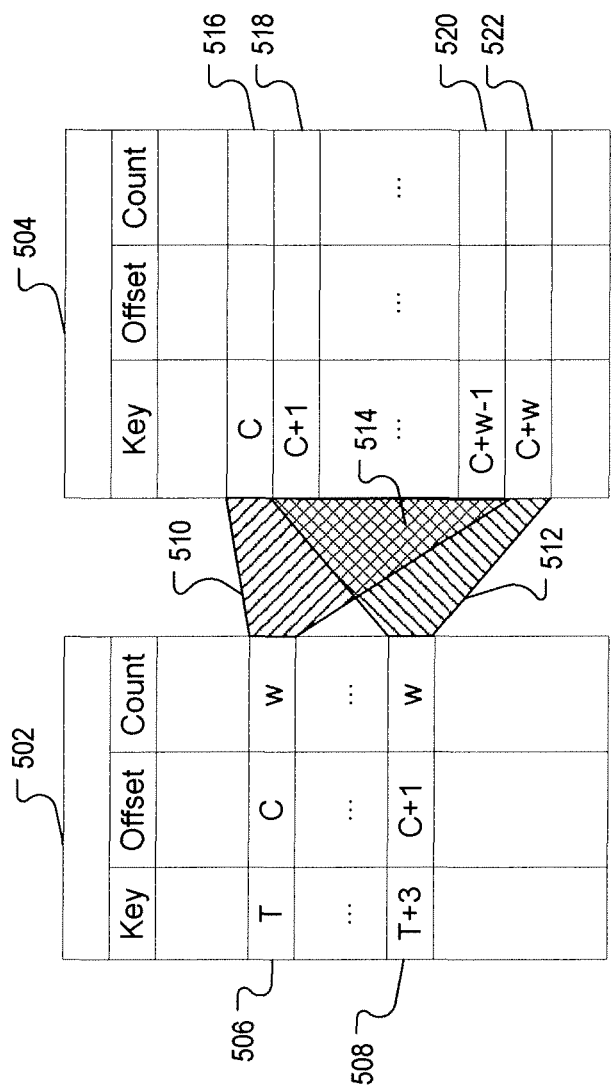
FIG. 5 shows an example of interaction between two data structures.

FIG. 5 shows an example of interrelation of two data structures. A first data structure 502 which refers to elements of a second data structure 504 is shown. For example, the first data structure 502 could be the security check data structure 302 of FIG. 3 and the second data structure 504 could be the virtual check data structure 304 of FIG. 3. In another scenario, the first data structure could be the virtual check data structure 304 of FIG. 3 and the second data structure could be the security processes data structure 306 of FIG. 3. In yet another scenario, the first data structure could be the security processes data structure 306 of FIG. 3 and the second data structure could be the operations data structure 308 of FIG. 3.

Multiple entries in one data structure may point to the same entries in the another data structure. In this example, key 'T' 506 in the first data structure 502 refers to offset 'C' with count W which corresponds to the 'C' key 516 in the second data structure 504. As shown by the shaded region 510, the first data structure 'T' 506 identifies entries 'C' 516 through 'C+w−1' 520 in the second data structure. As shown by the shaded region 512, the "T+3" entry 508 in the first data structure 502 identifies entries 'C+1' 518 through 'C+w' 522 in the second data structure 504. The shaded region 514 identifies the entries in the second data structure 504 which are identified by both the 'T' entry 506 and the 'T+3' entry 508.

Figure 6:
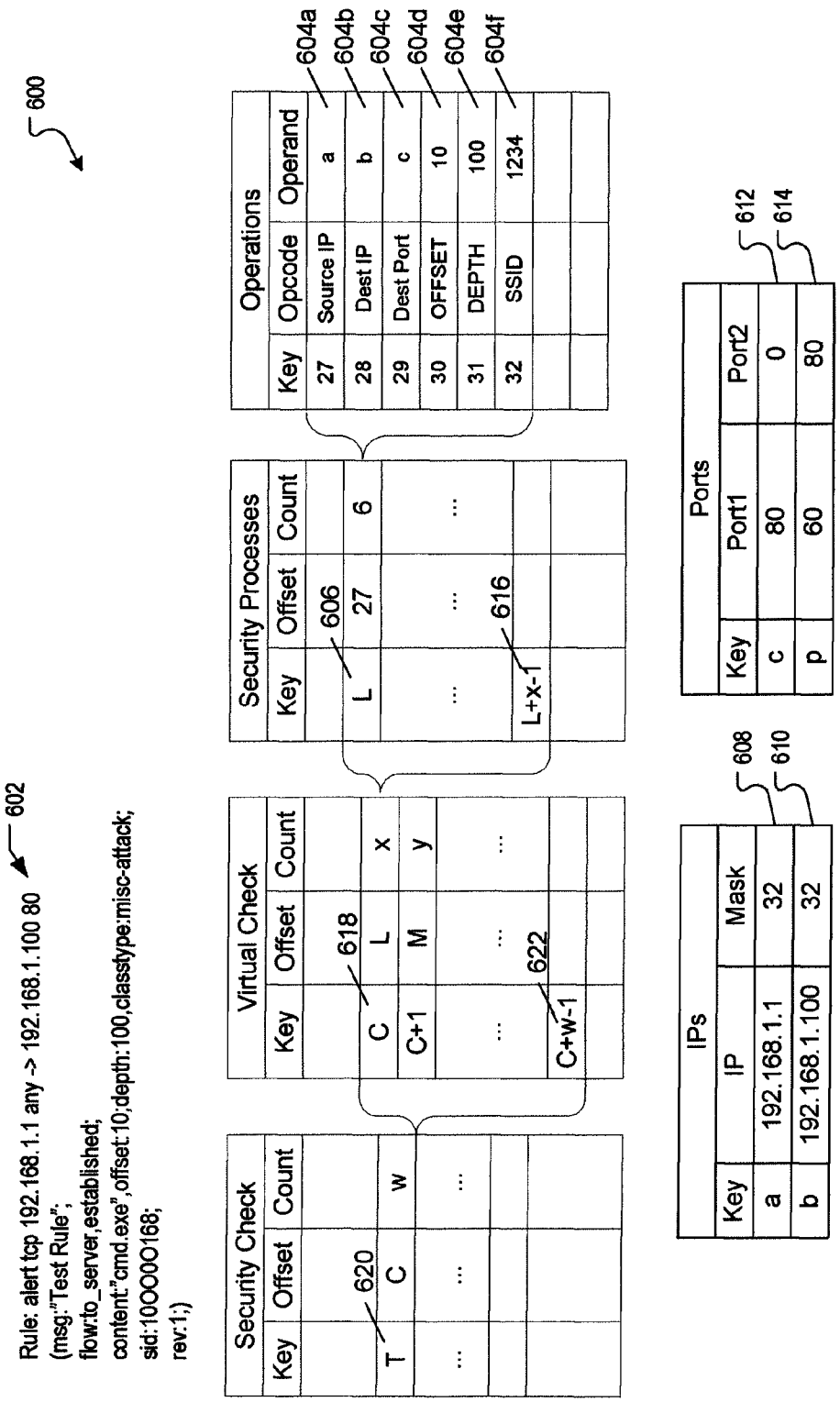
FIG. 6 shows an example of storing a portion of a rule in the data structures.

FIG. 6 shows an example of mapping a rule into the data structures. Rule 602 requires that an alert "Test Msg" be raised if, among other criteria, a packet is sent from IP Address 192.168.1.1 on any port to 192.168.1.100 on port 80 and if the content of the packet includes "cmd.exe" in an offset of 10 and a depth of 100.

The rule parser receives rule 602 and determines that the operations which check the source IP address and port, the destination IP address and port, the offset, and the depth should be included in the same security process. The rules parser inserts entries into the operations data structure corresponding to the conditions of the rule. For example, operations 604a-f are identified by security process 606. Some operations are fully expressed by an opcode and an operand. For example, operation 604d describes an "OFFSET" opcode with an operand of "10" and operation 604e defines an operation of "DEPTH" and an operand of "100."

Other operations require additional data structures to fully define the operation. These additional data structures allow for efficient security operations. For example, the data structures allow for an operation to specify a range of values. A security operations may check if the packet is addressed to any port within a range of ports, for example ports 40-120. Without the ability to define a range of ports, this check would require 81 highly repetitive security operations. By defining a range of ports in a single data structure, the same check may be accomplished with a single operation.

For example, the operation 604a with an opcode of "Source IP" references an entry in an IP data structure. An entry in the IP data structure 608 corresponds to the operation 604a. In some embodiments, the opcode of the operation 604a identifies the data structure and the operand of the operation 604a provides a key to the IP data structure 608. In other embodiments, the operand of the operation 604a identifies an offset into the IP data structure.

The IP data structure may contain an IP field which includes an Internet Protocol Address and a mask which identifies a type of network. For example, a mask value of 24 indicates a Class C network, a value of 16 indicates a Class B network, and a value of 32 indicates a specific network address. In general, a class B network encompasses all IP addresses that share the first two dotted decimal values in the address. For example, the IP address 192.168.0.0 with a mask of 16 would match IP addresses from 192.168.0.0 to 192.168.255.255. A class C network encompasses all IP addresses which share the first three dotted decimal values in the address. For example, the IP address 192.168.1.0 with a mask of 24 would indicate the address block from 192.168.1.0 to 192.168.1.255. In contrast, an IP address 192.168.1.1 with a mask of 32 would match only IP address 192.168.1.1.

Operation 604c identifies an entry in the ports' data structure. In some embodiments, the opcode of the operation 604c provides a key to the ports' data structure. In other embodiments, the opcode of the operation 604c identifies an offset into the ports' data structure. In general, the port data structure identifies a single port of a range of ports. For example, port entry 612 describes a single port, port 80. In this embodiment, the zero in the Port2 field indicates no port. Entry 614 in the port data structure provides two values, port1 has a value of 60, and port2 has a value of 80. This identifies a range of ports from port 60 to port 80.

In general, the operations describe conditions which must be met to cause the security check to be true. For example, operation 604c coupled with the port data structure entry 612 requires that the packet be sent to port 80. If, for example, a packet were sent to another port, for example port 100, then the conditions of the operation would not be met, at which point the conditions of the security process 606 would not be met and no further processing of that security process would be required. That is, no further operations associated with the security process would need to be checked.

For example, in one scenario, security check 620 includes virtual check 618 and virtual check 622. Virtual check 618 includes security process 606 and security process 616. Security process 606 includes security operations Source IP 604a, Dest IP 604b, Dest Port 604c, OFFSET 604d, DEPTH 604e, and SSID 604f. The security operation Source IP 604a references the IP data structure entry a 608 checking for a source IP address of 192.168.1.1. If security check 620 is being executed against a packet with a source IP address of 192.168.1.2, then the source IP operation did not match the packet. Once it is determined that the security operation 604a does not match, the remaining security operations 604b-f in the security process 606 will not be executed.

Once it is determined that the conditions of the security process 606 have not been met, it follows that the conditions of virtual check 618 have not been met, and therefore, operations associated with other security processes identified by the virtual check would not have to be performed, for example security process 616. Likewise, once it is determined that the conditions of virtual check 618 have not been met, it follows that the conditions of the security check 620 have not been met, and therefore, operations associated with other virtual checks identified by the security check would not have to be performed, for example virtual check 622. That is, an operation that does not meet its condition terminates processing of the entire security check. In some embodiments, if the same packet results in a first security check and second security check which both identify a common operation, and the conditions of that operation are not met when processing the first security check, the second security check does not need to be processed.

Figure 7:
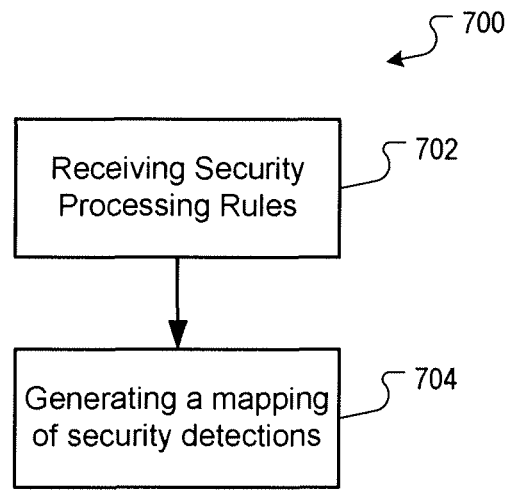
FIG. 7 is a flow chart illustrating an example process for token processing.

FIG. 7 is a flow chart illustrating an example process for token processing. The example process 700 can be implemented in a rules parser, for example the rules parser 234 of FIG. 2, or embodied in software code that runs independently as a separate program with its own computer processes, services, and processes.

The process receives security processing rules (702). Each of security processing rules define one or more security checks and security processes corresponding to each security check. The security processes are to be performed when the security check occurs.

The process generates a mapping of security checks 704. The security checks are mapped to security processes. The mapping includes a security check entry for each security check that is defined in the security processing rules. Each security check is mapped to one or more security process which the security processing rules define as corresponding to the security check. In some embodiments, an entry in a security check table is generated for each security check.

Figure 8:
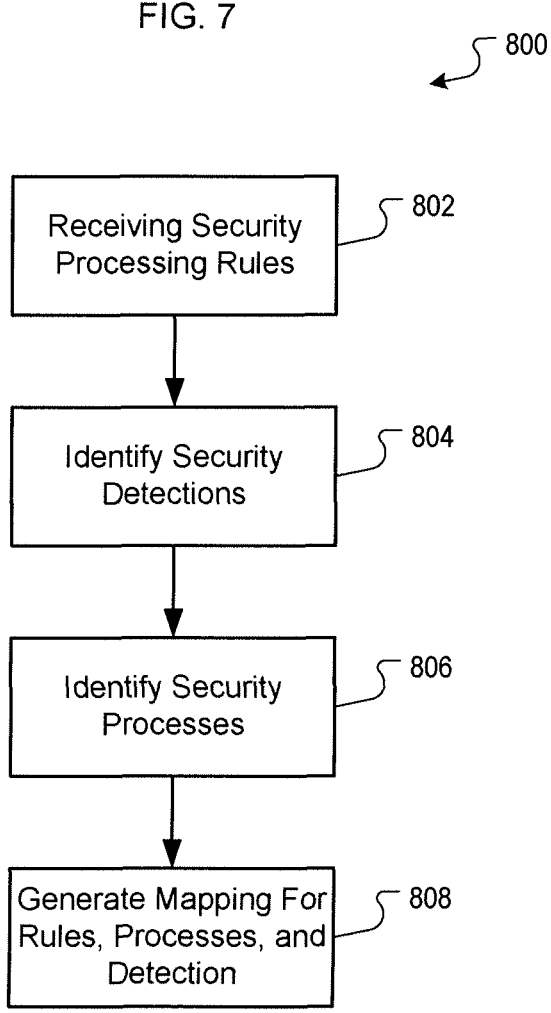
FIG. 8 is a flowchart showing an example process for token processing.

FIG. 8 is a flowchart showing an example process for token processing. The example, process 700 can be implemented in a rules parser, for example the rules parser 234 of FIG. 2, or embodied in software code that runs independently as a separate program with its own computer processes and services.

The process receives security processing rules (802) in a manner similar to the receiving security processing rules (702) as described above with respect to FIG. 7.

The process identifies security checks (804). The received security processing rules contain one or more security checks. In some embodiments, one security check is identified for each rule. In other embodiments, one or more security checks may be identified for each rule.

The process identifies security processes (806). Security processes represent a group of operations which frequently occur together or are unique for a single rule. In one embodiment, the process identifies operations that are required by the security processing rules. The process groups operations which occur together in more than one rule into a security process. In some embodiments, the remaining operations for each rule are grouped into a security process, one process for each rule. In other embodiments, the remaining operations are each assigned their own security process.

The process generates mappings for security checks and security processes. In some embodiments, security processes are mapped to security checks through a virtual check data structure. Each virtual check identifies a plurality of security processes and each security check identifies a plurality of virtual checks. Generally, security checks are mapped to security processes in a manner to enable the reuse of security processes in virtual checks and to enable the reuse of virtual checks in security checks.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including. by way of example. a programmable processor, a computer, a system on a chip, or multiple ones, or combinations of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
   determining that a particular one of a plurality of tokens is included in one or more packets of network traffic;
   identifying a particular set of security checks corresponding to the particular token, the set of security checks including one or more security checks of a plurality of security checks, wherein each security check includes one or more security processes of a plurality of security processes, and each security process includes one or more security operations of a plurality of security operations, and wherein each security process corresponds to an alert condition satisfied based on results of the respective set of security operations;
   using a data structure mapping of security checks to security operations to identify for each security check in the particular set of security checks a respective set of processes, and for each security process in the set of security processes a respective set of security operations to be applied to data of the one or more packets, wherein a particular security operation is reused between at least two, but less than all, of the plurality of security checks, and the data structure includes a check data structure including entries for each of the security checks in the plurality of security checks, each security check entry referencing entries of a security process data structure corresponding to the set of security processes included in the respective security check, the security process data structure including, for each security process, a reference to entries of a security operation data structure corresponding to the set of security operations of the respective security process.

2. The computer-implemented method of claim 1, wherein each of the entries of the operation data structure includes an opcode and an operand identifying a security operation.

3. The computer-implemented method of claim 1, further comprising applying at least one of the security operations mapped to one or more of the set of security checks to data of the one or more packets.

4. The computer-implemented method of claim 3 wherein applying the first security check to the data includes terminating the first security check in response to determining that a security operation of the one or more security operations did not return a true value.

5. The computer-implemented method of claim 4 wherein applying the first security check to the data includes determining not to process a second security check associated with the security operation.

6. The method of claim 1, wherein each reference to records of the security process data structure within records of the check data structure includes an offset value and a count value.

7. The method of claim 1, wherein each reference to records of the security operation data structure within records of the security process data structure includes an offset value and a count value.

8. A non-transitory computer storage medium encoded with a computer program, the program comprising instructions that when executed by data processing apparatus cause the data processing apparatus to perform operations comprising:
   determining that a particular one of a plurality of tokens is included in one or more packets of network traffic;
   identifying a particular set of security checks corresponding to the particular token, the set of security checks including one or more security checks of a plurality of security checks, wherein each security check includes one or more security processes of a plurality of security processes, and each security process includes one or more security operations of a plurality of security operations, and wherein each security process corresponds to an alert condition satisfied based on results of the respective set of security operations;
   using a data structure mapping of security checks to security operations to identify for each security check in the particular set of security checks a respective set of processes, and for each security process in the set of security processes a respective set of security operations to be applied to data of the one or more packets, wherein a particular security operation is reused between at least two, but less than all, of the plurality of security checks,
   the data structure includes a check data structure including entries for each of the security checks in the plurality of security checks, each security check entry referencing entries of a security process data structure corresponding to the set of security processes included in the respective security check, the security process data structure including, for each security process, a reference to entries of a security operation data structure corresponding to the set of security operations of the respective security process.

9. The non-transitory computer storage medium of claim 8, wherein each of the entries of the operation data structure includes an opcode and an operand identifying a security operation.

10. The non-transitory computer storage medium of claim 8, further comprising applying at least one of the security operations mapped to one or more of the set of security checks to data of the one or more packets.

11. The non-transitory computer storage medium of claim 10 wherein applying the first security check to the data includes terminating the first security check in response to determining that a security operation of the one or more security operations did not return a true value.

12. The non-transitory computer storage medium of claim 11 wherein applying the first security check to the data includes determining not to process a second security check associated with the security operation.

13. The non-transitory computer storage medium of claim 8, wherein each reference to records of the security process data structure within records of the check data structure includes an offset value and a count value.

14. The non-transitory computer storage medium of claim 8, wherein each reference to records of the security operation data structure within records of the security process data structure includes an offset value and a count value.

15. A system comprising:
   one or more computers, and;
   a computer-readable medium coupled to the one or more computers having instructions stored thereon which, when executed by the one or more computers, cause the one or more computers to perform operations comprising:
      determining that a particular one of a plurality of tokens is included in one or more packets of network traffic;
      identifying a particular set of security checks corresponding to the particular token, the set of security checks including one or more security checks of a plurality of security checks, wherein each security check includes one or more security processes of a plurality of security processes, and each security process includes one or more security operations of a plurality of security operations, and wherein each security process corresponds to an alert condition satisfied based on results of the respective set of security operations;

using a data structure mapping of security checks to security operations to identify for each security check in the particular set of security checks a respective set of processes, and for each security process in the set of security processes a respective set of security operations to be applied to data of the one or more packets, wherein a particular security operation is reused between at least two, but less than all, of the plurality of security checks, and the data structure includes a check data structure including entries for each of the security checks in the plurality of security checks, each security check entry referencing entries of a security process data structure corresponding to the set of security processes included in the respective security check, the security process data structure including, for each security process, a reference to entries of a security operation data structure corresponding to the set of security operations of the respective security process.

* * * * *